April 2, 1957 H. R. ABBRECHT 2,787,017
BRUSH
Filed Dec. 20, 1950 4 Sheets-Sheet 1
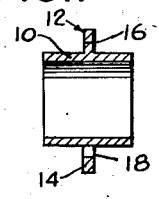
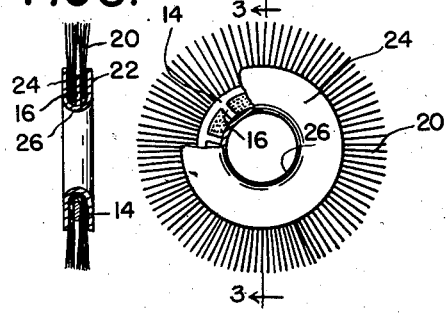
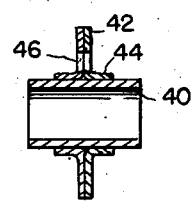
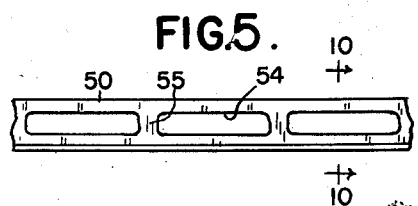
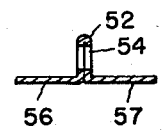
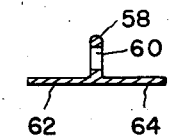
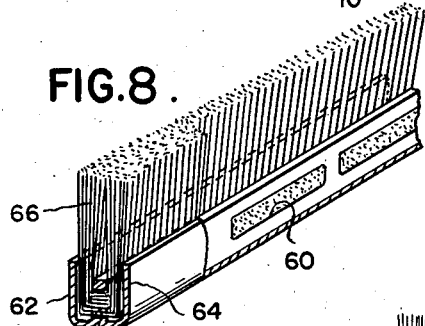
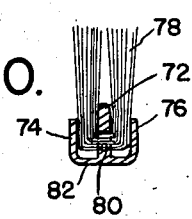
INVENTOR.
HERMANN R. ABBRECHT
BY
ATTORNEYS April 2, 1957     H. R. ABBRECHT     2,787,017
BRUSH
Filed Dec. 20, 1950     4 Sheets-Sheet 2
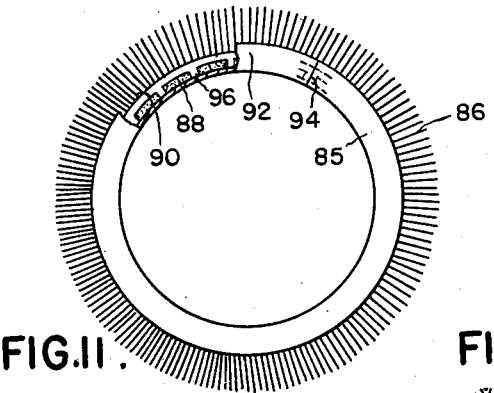
FIG.11.
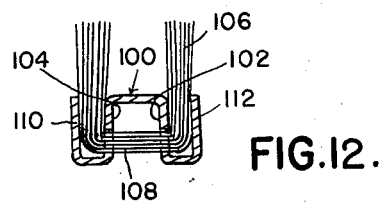
FIG.12.
FIG.14.
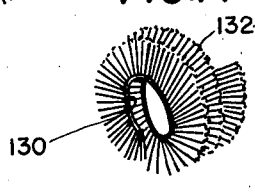
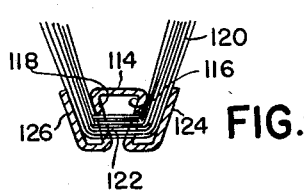
FIG.13.
FIG.15.
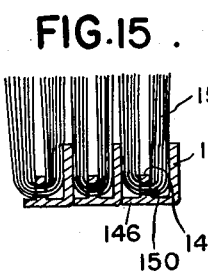
FIG.16.
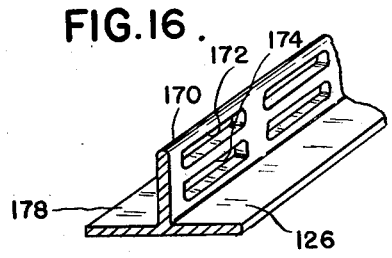
FIG.17.
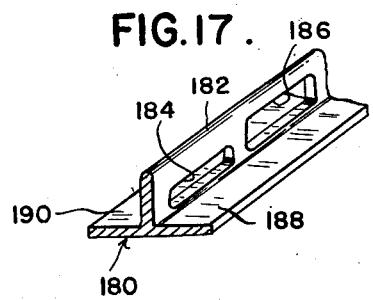
INVENTOR.
HERMANN R. ABBRECHT
BY
ATTORNEYS April 2, 1957     H. R. ABBRECHT     2,787,017
BRUSH
Filed Dec. 20, 1950     4 Sheets-Sheet 3
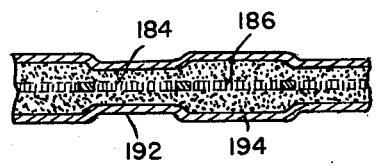
FIG.19.
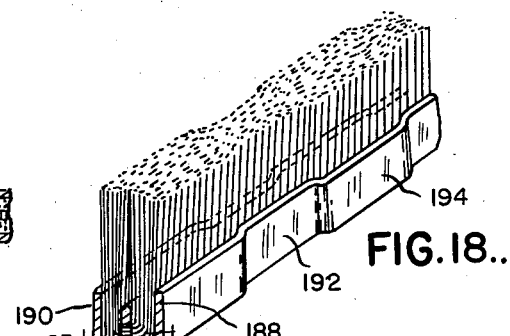
FIG.18.
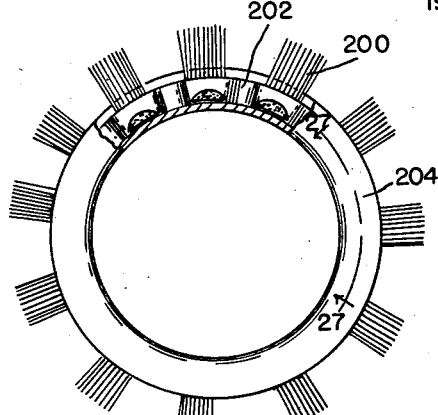
FIG.20.
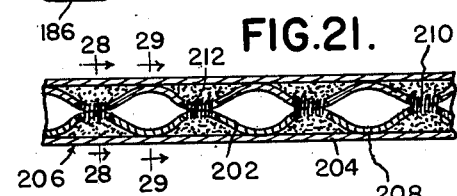
FIG.21.
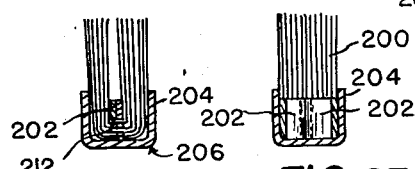
FIG.22.     FIG.23.
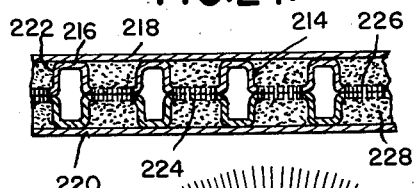
FIG.24.     FIG.25.     FIG.27.
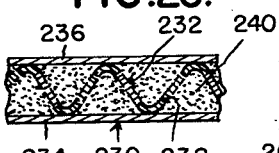
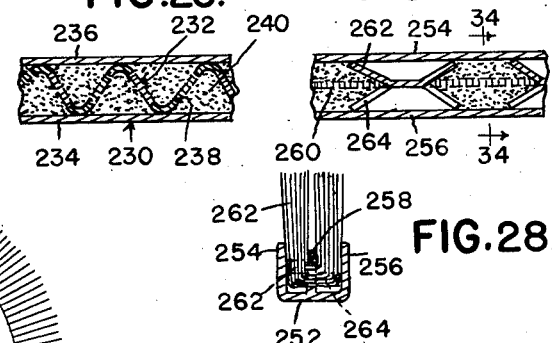
FIG.28.
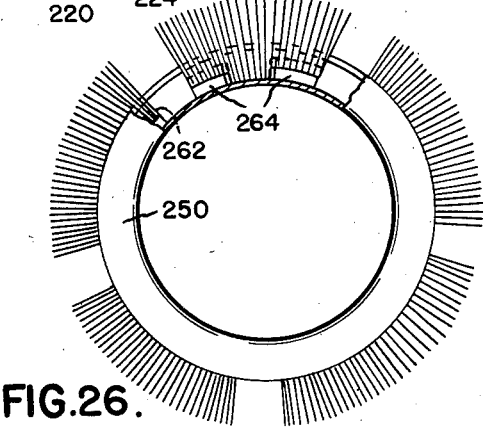
FIG.26.
INVENTOR.
HERMANN R. ABBRECHT
BY
*Whittemore Hulbert Belknap*
ATTORNEYS

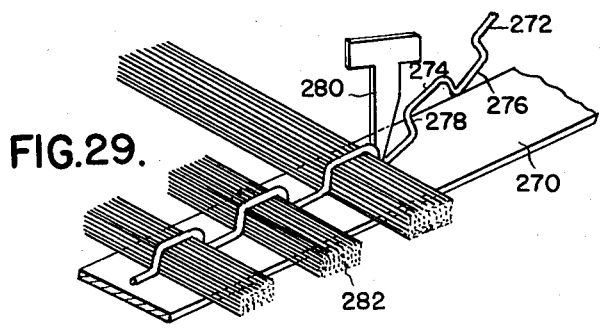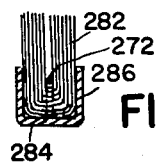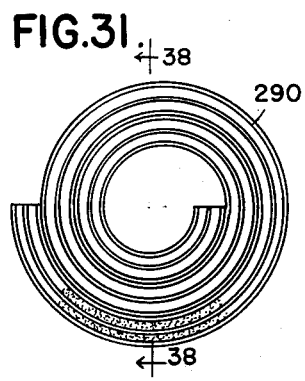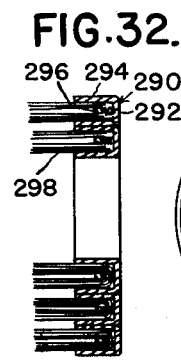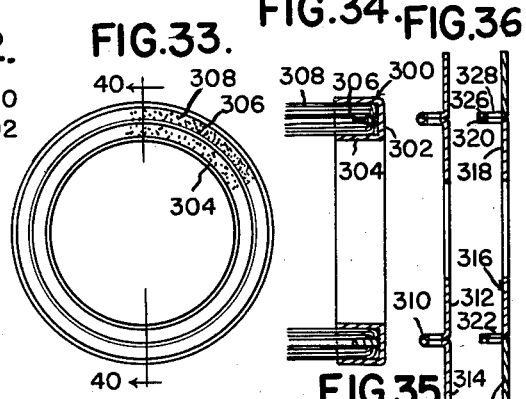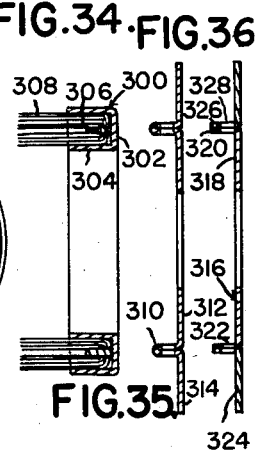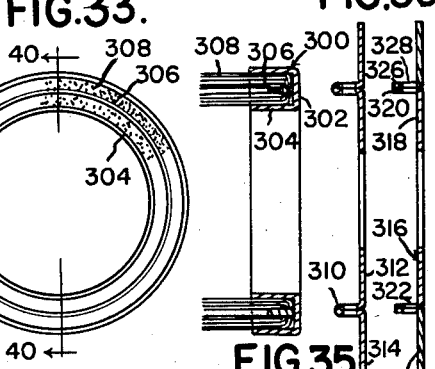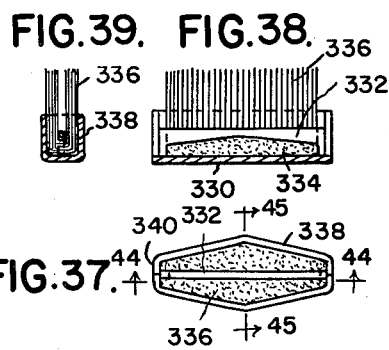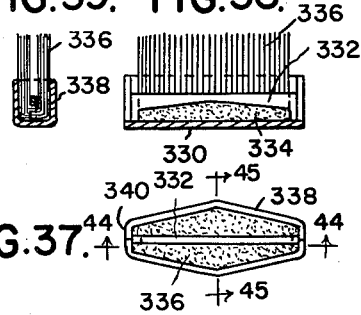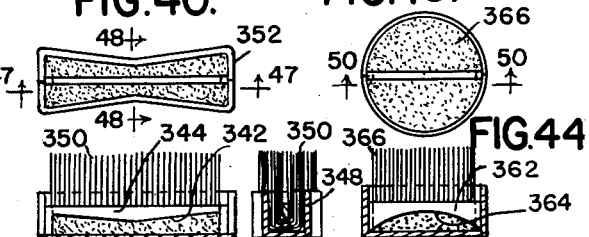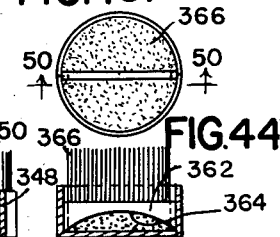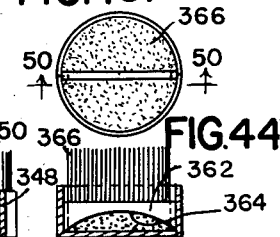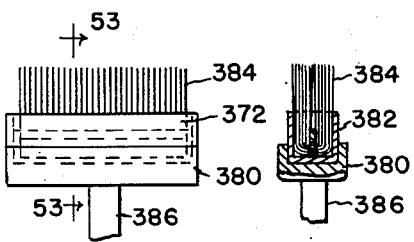

United States Patent Office 2,787,017
Patented Apr. 2, 1957

2,787,017

BRUSH

Hermann R. Abbrecht, Birmingham, Mich.

Application December 20, 1950, Serial No. 201,820

4 Claims. (Cl. 15—205)

The present invention relates to brushes and more particularly to a brush characterized by the novel means for supporting the filler material.

It is an object of the present invention to provide a rotary brush capable of being used at high speed operation without the possibility of the filler shifting in use.

It is a feature of the present invention to provide a brush comprising essentially a channel structure and a filler retainer located in the channel extending upwardly of the channel from the bottom wall of the channel, the bottom wall of the channel supporting the retainer against movement.

Other objects and features of the invention will become apparent as the description proceeds, especially when taken in conjunction with the accompanying drawings, wherein:

Figure 1 is a longitudinal sectional view of an integral support and retainer structure used in producing brushes in accordance with the present invention.

Figure 2 is a side elevation of a brush partly in section, constructed from the element shown in Figure 1.

Figure 3 is a sectional view on the line 3—3 Figure 2.

Figure 4 is a view similar to Figure 1 illustrating another embodiment of the present invention.

Figure 5 is a fragmentary side elevation of a portion of a combined support and retainer element.

Figure 6 is a section on the line 10—10, Figure 5.

Figure 7 is a sectional view similar to Figure 6 showing another embodiment of the present invention.

Figure 8 is a perspective view partly in section, showing a brush constructed from the supporting member shown in Figure 7.

Figure 9 is a fragmentary side elevation similar to Figure 5, showing a modified support member.

Figure 10 is a transverse sectional view through a brush illustrating another modified construction.

Figure 11 is a side elevation partly in section, of a brush constructed in accordance with another modification of the present invention.

Figure 12 is a transverse sectional view through a brush illustrating a modification thereof.

Figure 13 is a sectional view similar to Figure 12, illustrating yet another modification thereof.

Figure 14 is a fragmentary perspective view illustrating a helically formed brush produced from an elongated supporting member of the type disclosed herein.

Figure 15 is a sectional view illustrating yet another modification thereof.

Figure 16 is a fragmentary perspective view illustrating a specific modification of the filler retainer element.

Figure 17 is a fragmentary perspective view illustrating yet another modification of the filler retainer element.

Figure 18 is a perspective view partly in section, illustrating a completed brush embodying the supporting member shown in Figure 17.

Figure 19 is a fragmentary section on the line 25—25, Figure 18.

Figure 20 is a front elevation with parts broken away, illustrating a modified construction of brush.

Figure 21 is a developed sectional view on the line 27—27, Figure 20.

Figure 22 is a transverse sectional view on the line 28—28, Figure 21.

Figure 23 is a transverse sectional view on the line 29—29, Figure 21.

Figure 24 is a longitudinal transverse section through a filler supporting structure illustrating another modification of the present invention.

Figure 25 is a sectional view similar to Figure 24 illustrating yet another modification of the present invention.

Figure 26 is a front elevation with parts broken away, illustrating yet another modification of the present invention.

Figure 27 is a transverse sectional view through the filler retainer structure illustrated in Figure 26.

Figure 28 is a section on the line 34—34, Figure 27.

Figure 29 is a perspective view illustrating a novel method of producing brushes in accordance with the present invention.

Figure 30 is a transverse sectional view through a brush constructed by the method illustrated in Figure 29.

Figure 31 is a front elevation of a modified form of brush in which part of the filler material has been omitted.

Figure 32 is a section on the line 38—38, Figure 31.

Figure 33 is a front elevation of a modified form of brush with portions of the filler material omitted.

Figure 34 is a section on the line 40—40, Figure 33.

Figure 35 is a sectional view through a modified combined support and retainer similar to that illustrated in Figure 34.

Figure 36 is a transverse sectional view through another combined support and retainer.

Figure 37 is a front elevational view of a modified brush construction.

Figure 38 is a sectional view on the line 44—44, Figure 37.

Figure 39 is a section on the line 45—45, Figure 37.

Figure 40 is a front elevation of a modified brush construction.

Figure 41 is a sectional view on the line 47—47, Figure 40.

Figure 42 is a transverse sectional view on the line 48—48, Figure 40.

Figure 43 is a front elevational view of a modified brush construction.

Figure 44 is a section on the line 50—50, Figure 43.

Figure 45 is a plan view of the sheet metal construction employed in producing the brush illustrated in Figures 43 and 44.

Figure 46 illustrates the application of brushes of the type described herein to a rotary holder.

Figure 47 is a section on the line 53—53, Figure 46.

One of the most serious problems to be overcome before rotary brushes can be employed for high speed brushing operations is to support the filler material in such a way that it is firmly held even under very high speed rotation. According to the present invention, this is accomplished by a construction in which a channel shaped support element is provided with a filler retainer which is rigidly supported from the bottom wall of the channel. The construction is extremely simple and offers important advantages as regards cost and simplicity of manufacture even though applied to straight brushes. The present invention contemplates the provision of either straight or circular brushes. In the case of circular brushes they may be formed initially from tubular material, the ends of which are formed outwardly to provide generally radially extending flanges which are crimped in to assist in holding the filler material. Alternatively, circular brushes may be produced by forming elongated straight brushes, shaping the supporting structure of the straight brush into annular form and welding, brazing or otherwise permanently securing the ends of the supporting structure together.

In the case of a brush formed initially from tubular stock, it is possible to provide a structurally independent brush retainer, although as will presently appear, it is ordinarily preferable to form the channel shaped supporting element and the filler retainer element integral.

Referring now to the drawings, in Figure 1 there is illustrated an element to be used in the production of brush structure shown in Figures 2 and 3. This element comprises a tubular portion 10 having a flat annular radially extending portion indicated generally at 12, including an outer continuous annular bar portion 14 and radially extending separator portions 16 which connect the bar portion to the tubular portion 10, the spaces between the separator elements 16 and the annular bar 14 being filler receiving openings designated 18. Filler material 20 in the required amount is introduced through the openings 18 and the ends of the tubular element 10 are crimped outwardly to form channel side wall portions 22 and 24 connected by the bottom wall 26. The side wall portions 22 and 24 are crimped inwardly to firmly lock the doubled over filler material in the position best illustrated in Figure 3.

Alternatively, and as seen in Figure 4, the supporting structure may comprise a tubular body 40 onto which are pressed a pair of annular members 42, each having a tubular collar 44 thereon. The members 42 are apertured as indicated at 46 to provide the necessary filler receiving openings.

The structure so far described related to the manufacture of a circular brush from elements which are essentially annular in character. However, the present invention is not limited to the production of circular brushes of the foregoing type. Instead, elongated brush structure may be produced from the supporting structure illustrated in Figures 5 and 6. In these figures an elongated strip 50 is shown as formed from flat stock which is crimped at its center to provide a filler retainer 52 having filler receiving openings 54 therein. As best seen in Figure 5, the filler receiving openings 54 are spaced apart and are separated by separator elements 55. The sides 56 and 57 of the strip in the completed article are bent outwardly to extend generally parallel to the filler retainer 52 after the filler material has been introduced in desired quantities through the openings 54.

In Figure 7 there is illustrated a slight modification of the structure of Figures 5 and 6. In this case the strip differs in that the filler retainer 58 instead of being formed of a doubled portion intermediate the edges of the strip, is a single integral outwardly extending flange. Filler receiving openings 60 are provided as before and the edges 62 and 64 of the strip are adapted to be bent upwardly after the filler material has been introduced into the openings 60. In Figure 8 a completed brush is shown employing the supporting structure of Figure 7, the filler material being shown at 66.

Referring now to Figure 9 there is illustrated a modified construction in which the openings 68 through the filler retainer 70 are not elongated as in the modifications previously described, but instead are circular and are spaced apart a substantial distance. This type of supporting structure is particularly useful in the production of a tufted brush.

While in the foregoing embodiments of the invention the side walls of the channel have been illustrated as extending outwardly beyond the intermediate filler retainer, in Figure 10 the filler retainer 72 is illustrated as extending outwardly beyond the side walls 74 and 76 of the channel. The filler material 78 extends through the filler receiving openings 80 in the filler retainer, which in this construction is illustrated as integral with and extending outwardly from the bottom wall 82 of the channel.

Referring now to Figure 11 there is illustrated a brush having a relatively large annular supporting structure 85 which may initially be produced in elongated continuous formation such as illustrated in Figures 5–10. After the filler material 86 has been introduced into the openings 88 in the filler retainer 90, and the flanges 92 bent upwardly from the side walls of the channel, the ends of the elongated structure may be welded, brazed or otherwise permanently interconnected as shown at 94. It will be appreciated that before forming the elongated supporting structure into the annular arrangement illustrated in Figure 11, the ends of the supporting structure must include portions of the separator elements 96.

Referring now to Figure 12 there is illustrated a cross-sectional view through a modified form of the present invention. In this case the supporting structure is formed from thin stock in which the central portion is bent upwardly to provide a fold forming the filler retainer 100, the side walls of which, as indicated at 102 and 104, are spaced apart a substantial distance. The filler material 106 extends through openings 108 formed in the walls 102 and 104 and is retained in place by side walls 110 and 112 which are bent upwardly and crimped inwardly. The arrangement illustrated provides two axially spaced annular arrays of filler material.

In Figure 13 there is illustrated a slightly modified construction in which the filler retainer 114 has side walls 116 and 118 which are spaced apart and which also diverge outwardly. The filler material 120 extends through openings 122 formed in the walls 116 and 118, and the edges of the support are formed upwardly to provide side walls 124 and 126 for retaining the filler material in position. This construction provides two axially spaced circular arrays of filler material which extend outwardly in essentially conical formation.

Referring now to Figure 14 there is illustrated in perspective a brush in which the supporting structure 130 is coiled into substantially helical formation thus providing a continuous helical array of filler material 132.

Referring now to Figure 15 there is illustrated a modification brush construction. In this case the supporting structure comprises a side wall 144, a bottom wall 146, and a retainer 148 having filler receiving openings 150 therein. The filler material 152 extends through the openings 150. The filler retainer 148 is located substantially midway between the sides of the bottom wall 146. The supporting structure is wound in a closed helix, that is, with the edges of the bottom wall 146 of one convolution engaging the edges of the bottom wall of the next adjacent convolution. In other words, there is positive means for spacing the side walls 144.

Referring now to Figure 16 there is illustrated a modification of the present invention which accentuates its adaptability to produce brushes of widely differing characteristics. In this case the supporting structure comprises a strip including a filler retainer 170 having openings 172 and 174 formed therein. The openings 172 and 174 are provided in pairs which are in registration with each other longitudinally of the strip, the opening 172 being disposed outwardly with respect to the opening 174. In this construction filler material having different characteristics may be introduced through the openings 172 and 174 thus producing a finished brush in which the filler material comprises a central portion having one desired characteristic and an outer portion having a different characteristic. The strip includes side edges 176 and 178 which may be bent upwardly into channel formation to provide the side walls of the channel as in the embodiments previously described. Obviously, either the retainer or the side walls of the channel may be stepped or otherwise shaped as required to provide for independent gripping of the filler adjacent the openings in the retainer.

Referring now to Figure 17 there is illustrated a modified construction comprising a strip 180 having a filler retainer 182 extending outwardly from its mid-portion. The filler retainer 182 is provided with openings 184 and 186, it being understood that the relatively narrow openings 184 and the relatively wide openings 186 are alternated. The strip 180 includes the side edge portions 188 and 190 which may be bent upwardly into channel formation after the filler material has been inserted through the openings 182 and 184. The completed brush is illustrated in Figures 18 and 19, in which it will be observed that the side edges 188 and 190 are crimped inwardly a greater distance as indicated at 192 opposite to the relatively small openings 184, than they are as indicated at 194, opposite to the relatively large openings 186.

Referring now to Figures 20–23 there is illustrated yet another modified construction. In this case the brush is shown as of annular formation and means are provided for separating the filler material 200 into tufts. In order to produce this result the filler retainer structure best seen in Figures 21–23, is employed. The filler retainer structure comprises a pair of transversely sinuously curved rings 202 which contact the side walls 204 of the channel support 206 at spaced points as indicated at 208, and which then extend toward each other and engage each other at longitudinally spaced points 210. The rings 202 are provided with registering openings 212 for the reception of the filler material 200.

A somewhat modified construction is illustrated in Figure 24 in which the retainer comprises a pair of elongated elements 214 which are bent to provide flat portions 216 engaging the side walls 218 of the supporting channel 220. Adjacent each end of each flat portion 216 the elements extend generally directly inwardly of the channel as indicated at 222, and the elements 214 have central flat portions in abutment as indicated at 224, at which point the enlarged filler receiving openings 226 are provided. This provides a more desirable grouping of the filler material 228 into tufts and further permits the tufts to be of any desired size and spaced apart any desired distance.

Referring now to Figure 25 there is illustrated a modified construction in which the channel member 230 receives a filler retainer 232 which is transversely sinuously curved into zigzag formation to extend from one side wall 234 to the other side wall 236 of the channel 230. Each diagonally extending portion of the filler material is provided with an opening 238 through which a portion of filler material 240 extends. Obviously, two adjacent diagonally extending portions of the filler retainer together with an adjacent side wall of the channel defines a generally triangular shaped pocket which receives one side of the filler material extending through both of the adjacent openings 238.

Referring now to Figures 26–28 there is illustrated yet another embodiment of the present invention. In this case the brush is illustrated as of annular form and comprises the channel 250 having a bottom wall 252, and side walls 254 and 256. The filler retainer 258 is illustrated as integral with the material of the channel and it is provided with a plurality of filler receiving openings 260 through which the filler material 262 extends. In this modification the material of the filler retainer 258 which is cut out to define the openings 260, is bent outwardly into the tangs 262 and 264 which partially define pockets for supporting portions of the filler material so as to provide a tufted brush formation.

It will be appreciated that the specific modification of the filler retainer shown in Figures 12, 13, and 16–28 are applicable alike to the production of brushes formed initially from a straight channel section as illustrated in Figure 8, whether the brush remains a straight brush or is subsequently shaped to provide an annular brush of the type disclosed in Figure 11 or a helical brush disclosed in Figure 14. Moreover, the specific modifications of the filler retainer shown in these figures are applicable also to the brush in which the channel member is initially formed as a tubular element, the ends of which are flared and shaped outwardly to provide the side walls of the channel in the completed brush.

Referring now to Figure 29 there is illustrated a novel method of constructing brushes in accordance with the present invention. According to this method a continuous strip of sheet metal 270 may be advanced in step-by-step relation in conjunction with a preformed filler retainer element 272 which is shaped to provide upwardly extending U-shaped portions or loops 274 and interconnecting portions 276 which are to be attached to the strip 270. Filler material may be brought against a rear leg 278 of one of the loops 274 before the other leg is attached to the strip and thus avoid the necessity of passing the filler material endwise through a completed opening. By this method, it is therefore possible to pack filler material extremely tightly into the filler retaining loops. After the filler material has thus been introduced laterally into a partially closed loop the loop is moved down and is secured to the strip by suitable means. This may in a proper case be the result of welding by a welding electrode indicated schematically at 280, or the interconnecting portions 276 may be stapled or otherwise mechanically secured to the strip. Where it is possible to employ continuous filler material, the filler material may be severed to the desired length after the end portion has been thus clamped in place, two severed portions of filler material being indicated at 282 in the drawings. The brush of course is completed by bending the edges of the strip 270 upwardly to form a channel having a bottom wall 284 and side walls 286 which clamp the filler material 282 into position.

Referring now to Figures 31 and 32 there is illustrated a modified brush which may be readily produced in accordance with the present invention. In this case continuous brush structure is provided in the form of a channel 290 having a bottom wall 292 and side walls 294, in which the bottom wall 292 carries a filler retainer 296. Filler material 298 is disposed in the channel passing through openings provided between portions of the filler retainer 296 and the bottom wall of the channel 292 as previously described. In this case the elongated brush structure is coiled into a tight spiral as well indicated in Figure 31, thus producing a completed brush of substantially circular cross-section and one which moreover is provided with filler material from adjacent the center thereof to the periphery thereof.

Referring now to Figures 33 and 34 there is illustrated a modified annular brush in which the filler supporting structure comprises a channel 300 having a bottom wall 302 and side walls 304. Secured to the bottom wall 302 is the filler retainer 306 which is provided with a plurality of openings, intermediate portions thereof and the bottom wall 302, to receive the filler material 308. This brush is initially produced from a flat annular plate and a generally tubular annular retainer suitably secured to the plate. After the filler material has been passed through the aforesaid openings, the inner and outer edges of the annular plate are bent upwardly to form the side walls 304.

In Figure 35 there is illustrated a slight modification in which the structure for producing the brush shown in Figure 34 is initially formed from a single annular plate. A circular portion of the plate intermediate its inner and outer edges is formed outwardly to provide the double walled filler retainer 310, leaving the inner and outer edge portions 312 and 314 to be bent upwardly to form side walls of the channel in the completed article.

Referring now to Figure 36 a slight modification of the structure illustrated in Figure 35 is shown. In this Figure the supporting structure comprises an inner member 316 comprising a flat annular portion 318 and a tubular generally cylindrical portion 320 having openings 322 therein. A second annular plate 324 is provided having its inner edge turned inwardly to form a generally tubular filler retainer portion 326 provided with openings 328. The portions 320 and 326 may if desired be welded or otherwise secured together and the brush completed in the same manner as the brush illustrated in Figure 33.

Referring now to Figures 37–39 there is illustrated a modied brush. In this case the support comprises a plate 330 to which is secured a filler retainer 332 having its central portion spaced from the plate 330 to provide an opening 334 which is of non-uniform cross-section, and as illustrated in the figure, is substantially wider adjacent its center than adjacent its ends. The filler material 336 is introduced through the opening 334 and the edge portions of the plate 330 are bent upwardly to form side walls 338. Desirably, the plate 330 is initially formed to provide material to close around the ends of the brush as illustrated at 340.

Referring now to Figures 40–42 there is illustrated a brush substantially similar to that shown in Figures 37–39 except that the opening 342 provided between the central portion of the filler retainer 344 and the bottom plate 346 is of less width centrally than adjacent the ends thereof. In this case the edges of the plate 346 are bent upwardly and inwardly to provide the side walls 348 which retain the filler material 350 in place. Again, the support is initially shaped to provide sheet material sufficient to form the end walls 352.

It will be observed that the modifications of Figures 37 and 40 differ substantially in that in the first case the brush has more filler material adjacent its center, and in the second case it has more filler material adjacent the ends thereof.

Referring now to Figures 43 and 44 there is illustrated a construction in which the support plate 360 and the filler retainer 362 are shaped to provide an arcuate opening 364 for the reception of filler material 366. By proper design of the arcuate opening 364 the filler material 366 may be formed so as to be of substantially circular cross-section as best indicated Figure 43.

In Figure 45 there is illustrated a blank suitable for the production of the brush illustrated in Figure 43, and in this figure there is a circular central portion 370, generally arcuate portions 372, and the filler retainer element 370. Obviously, if the arcuate portions 372 are formed upwardly along the dotted line 376 a brush as illustrated in Figures 43 and 44 results.

Referring now to Figures 46 and 47 there is illustrated a use to which the brushes lend themselves. In these Figures there is illustrated a rotary support 380 of channel shape adapted to receive a channel shaped brush support 382 carrying the filler material 384. The holder or support 380 includes a rotary element 386 so that the assembly may be rotated about its axis in performing brushing operations mechanically.

While the foregoing constitutes a disclosure of a relatively large number of specific modifications, it will be observed that the basic underlying concept of all the illustrated embodiments remains the same. In other words, all embodiments comprise means retaining the filler material in position which is rigidly supported by and preferably is integral with the main brush support. Thus, in all cases the filler material is doubled around a supporting element or bar which is thus received within the bight of the filler material and this supporting element is retained in rigidly spaced relation from the bottom wall of the channel or other brush support. The specific modifications of the filler retainer permit the ready production of brushes which may be continuous or tufted, and which may provide means for employing conjointly two or more different types of filler material as is sometimes required. The present construction adapts itself readily to the large scale production of brushes on automatic machinery and thus contributes to the increased economy with which brushes may be produced.

It is desired to mention again that in the case of brushes designed for high speed rotary operation, the rigid support of the filler material provided by the filler retainers as disclosed herein, permits the production of brushes which can be used at high speeds than brushes of the type now commercially available.

Brushes constructed in accordance with the present invention may have the channel and filler retainer formed of metal, plastic, specially treated paper, or other material selected in accordance with the use to which the brush is to be put. The specific filler material will also be selected in accordance with the use for which the brush is intended and may include vegetable fibre, hair, wire either round or flat, flat strip material such as linen, or any other material suitable for the intended purpose.

The drawings and the foregoing specification constitute a description of the improved brush in such full, clear, concise and exact terms as to enable any person skilled in the art to practice the invention, the scope of which is indicated by the appended claims.

What I claim as my invention is:

1. A brush comprising a unitary, one-piece channel formed of thin material and having a bottom wall and opposed side walls, the bottom wall having a fold therein disposed to extend upwardly from the bottom of the channel and provided with transverse openings to form a filler retainer integral with said channel and comprising a continuous upper bar spaced from the bottom wall of said channel and rigid separator elements connecting spaced portions of said bar intermediate the ends thereof to the bottom wall of said channel, and filler material having doubled ends located within said channel beneath said bar and between adjacent pairs of separator elements.

2. A brush as defined in claim 1 in which the side walls of said double fold are separated to separate the filler material into two spaced arrays.

3. A brush comprising an elongated support of generally channel shape having relatively thin bottom and side walls, said bottom wall having an elongated continuous upwardly extending portion intermediate said side walls constituting an elongated filler retainer provided with a longitudinally extending series of transverse openings therethrough, filler material extending through said openings and doubled around the portions of said retainer located outwardly of the openings from said bottom wall, the side walls of said support being pressed inwardly to compress the portion of the filler material between said side walls and said retainer.

4. A brush as defined in claim 3 in which said retainer is shaped to provide two laterally spaced walls connected by a central web.

References Cited in the file of this patent

UNITED STATES PATENTS

| | | |
|---|---|---|
| 66,606 | McGill | July 9, 1867 |
| 390,715 | Strickel | Oct. 9, 1888 |
| 445,005 | Mahler | Jan. 20, 1891 |
| 670,894 | Emery | Mar. 26, 1901 |
| 968,820 | Vardell | Aug. 30, 1910 |
| 1,240,604 | Rasmesen | Sept. 18, 1917 |
| 1,722,479 | Nickels | July 30, 1929 |
| 1,878,323 | Quist | Sept. 20, 1932 |
| 1,922,752 | Vogler | Aug. 15, 1933 |
| 2,023,434 | Nagl | Dec. 10, 1935 |
| 2,045,373 | Scully | June 23, 1936 |
| 2,062,047 | Bickel | Nov. 24, 1936 |
| 2,149,890 | Kilburg | Mar. 7, 1939 |
| 2,296,922 | Gross | Sept. 29, 1942 |

FOREIGN PATENTS

| | | |
|---|---|---|
| 203,797 | Great Britain | Sept. 17, 1923 |